No. 764,107. PATENTED JULY 5, 1904.
A. T. BRADSHAW.
COOKING AND WARMING APPARATUS.
APPLICATION FILED SEPT. 3, 1903.
NO MODEL. 3 SHEETS—SHEET 1.
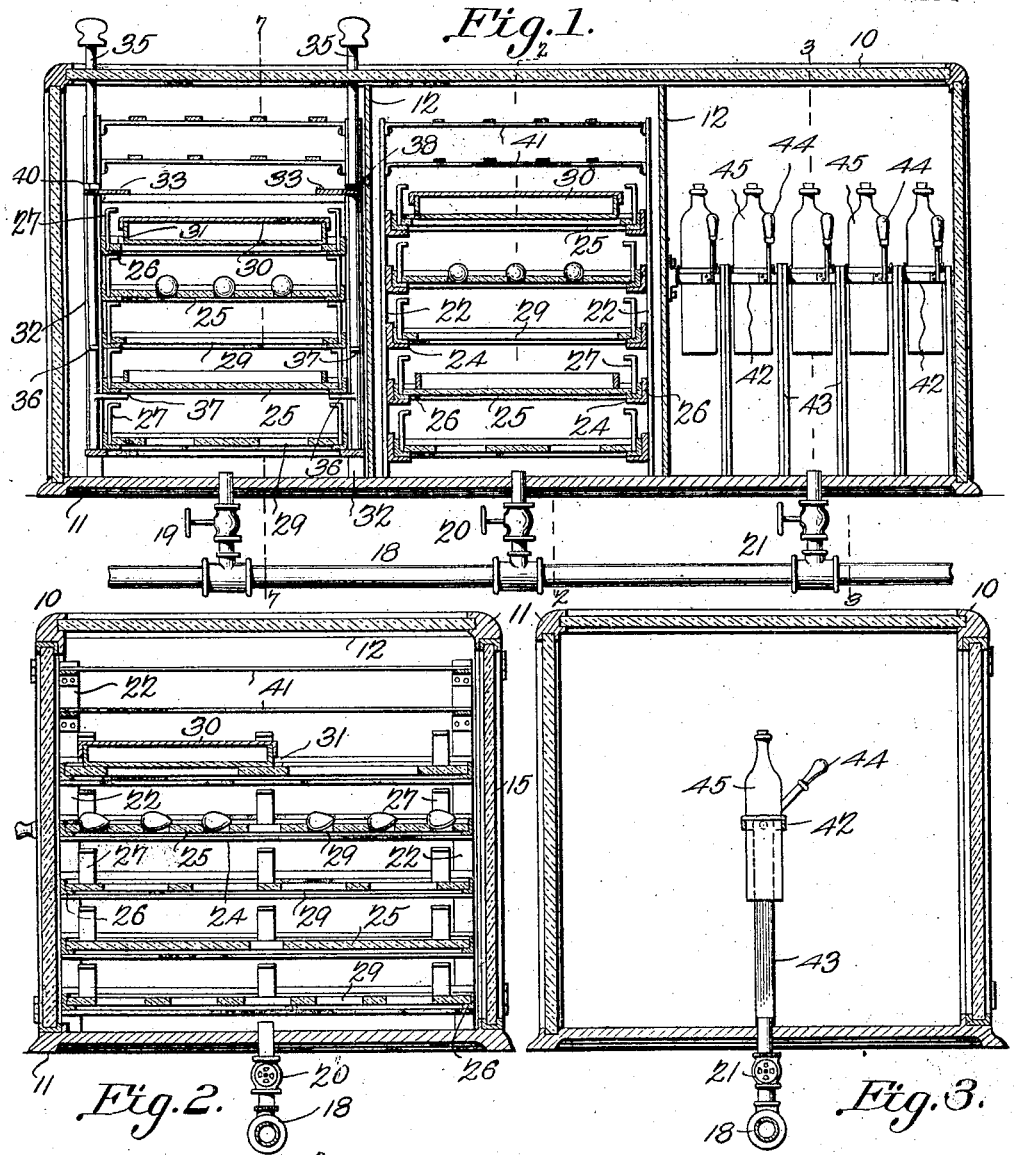
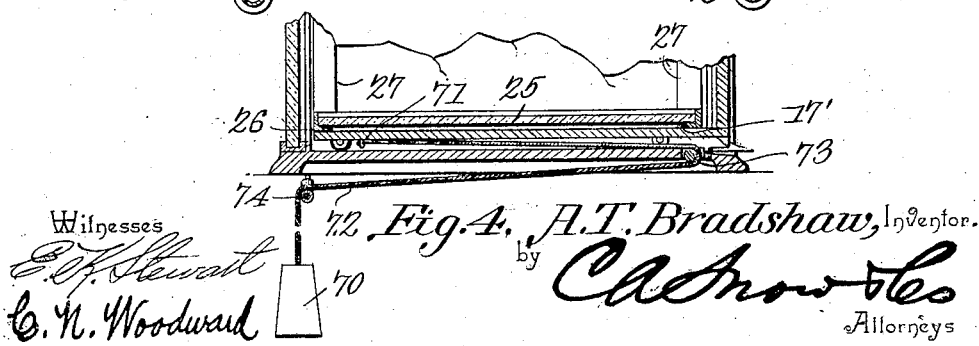
Witnesses
E. F. Stewart
C. N. Woodward
A. T. Bradshaw, Inventor.
by C. A. Snow & Co.
Attorneys No. 764,107. PATENTED JULY 5, 1904.
A. T. BRADSHAW.
COOKING AND WARMING APPARATUS.
APPLICATION FILED SEPT. 3, 1903.
NO MODEL. 3 SHEETS—SHEET 2.
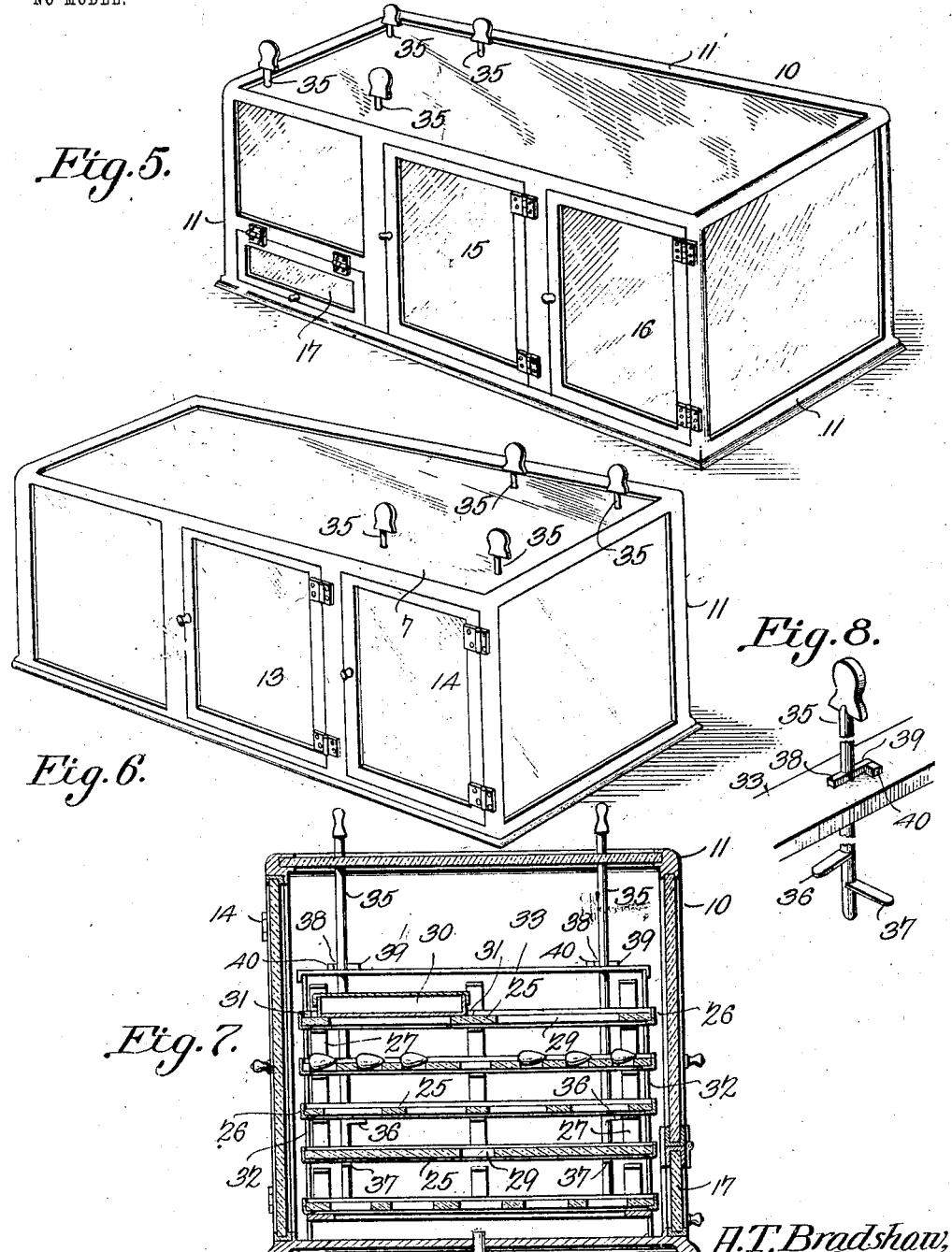

No. 764,107. PATENTED JULY 5, 1904.
A. T. BRADSHAW.
COOKING AND WARMING APPARATUS.
APPLICATION FILED SEPT. 3, 1903.
NO MODEL. 3 SHEETS—SHEET 3.
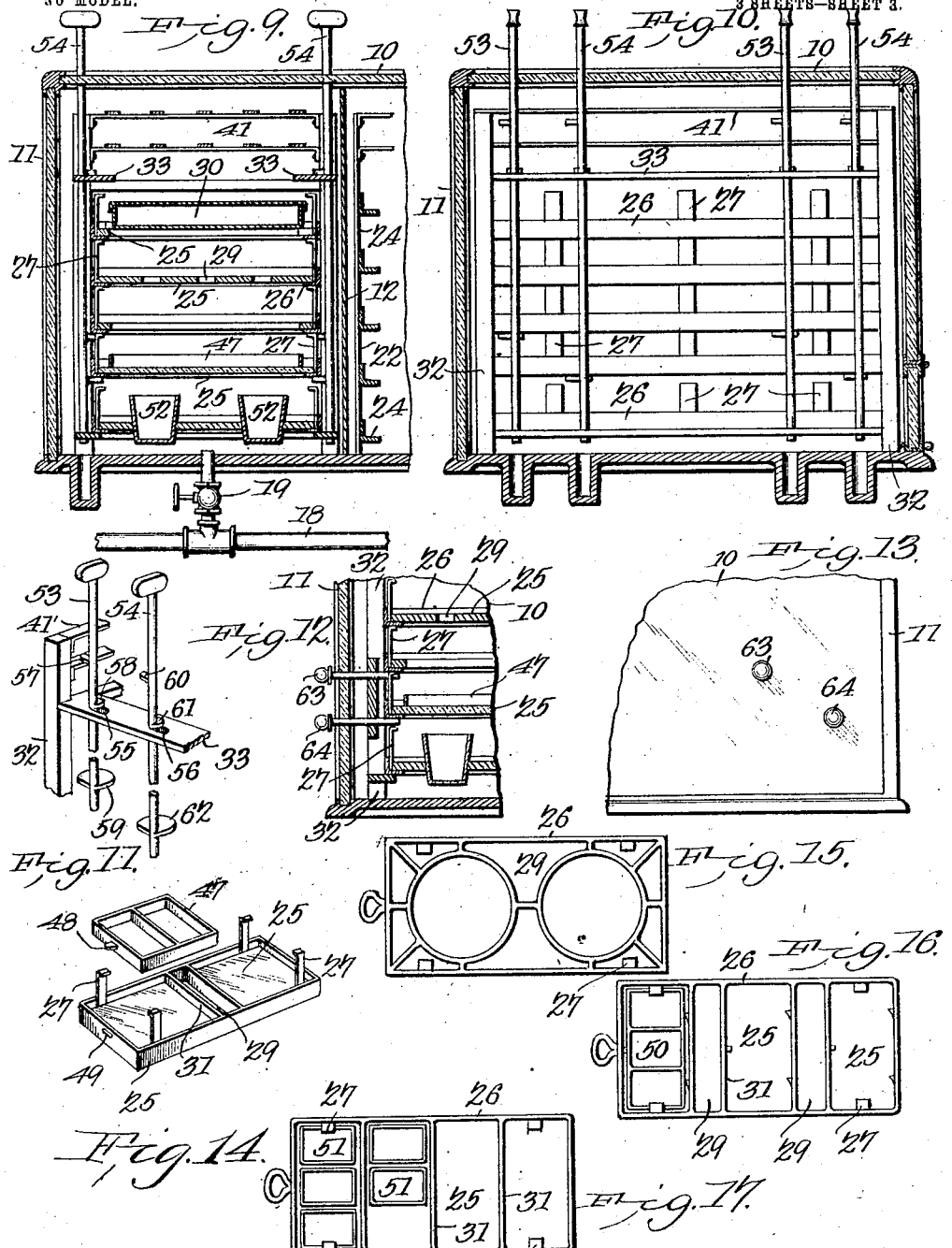

No. 764,107.

Patented July 5, 1904.

UNITED STATES PATENT OFFICE.

ARTHUR T. BRADSHAW, OF PHILADELPHIA, PENNSYLVANIA.

COOKING AND WARMING APPARATUS.

SPECIFICATION forming part of Letters Patent No. 764,107, dated July 5, 1904.

Application filed September 3, 1903. Serial No. 171,845. (No model.)

*To all whom it may concern:*

Be it known that I, ARTHUR T. BRADSHAW, a citizen of the United States, residing at Philadelphia, in the county of Philadelphia and State of Pennsylvania, have invented a new and useful Cooking and Warming Apparatus, of which the following is a specification.

This invention relates to the preparation of food products, and has for its object to produce a device wherein the food may be cooked and afterward maintained at a proper temperature until required for use; and the invention consists in an inclosing casing, preferably with walls of glass or similar material and divided into independent compartments each provided with independent heating means, and a plurality of trays for the food-receptacles adapted to be supported within one of said compartments until the food is cooked and then transferred to another of said compartments and the food maintained therein at the proper temperature until required for use.

The invention further consists in an inclosing casing divided into compartments each provided with independent heating means, a supporting-frame within one of said compartments and spaced from its walls, and a plurality of trays for the food-receptacle removably supported upon said frame until the food is cooked and adapted to be superimposed in another of said compartments and maintained at the proper temperature therein until required for use.

The invention further consists in an inclosing casing divided into compartments each with independent heating means, a plurality of trays for the food-receptacles adapted to be supported within one of said compartments until the food is cooked and then superimposed within another of said compartments and the proper temperature maintained until the food is required for use, and means whereby all but the lowermost of said trays may be supported and the lowermost tray removed without disturbing the remainder.

Other novel features of the invention will appear in the annexed description and be specified in the claims following.

In the drawings illustrative of the invention, in which corresponding parts are denoted by like designating characters, Figure 1 is a longitudinal sectional elevation. Fig. 2 is a transverse section on the line 2 2 of Fig. 1. Fig. 3 is a transverse section on the line 3 3 of Fig. 1. Fig. 4 is a sectional detail illustrating a modification in the construction. Fig. 5 is a perspective view from the front. Fig. 6 is a perspective view from the rear. Fig. 7 is a transverse section on the line 7 7 of Fig. 1. Fig. 8 is a perspective view illustrating the construction of the tray-delivery mechanism. Fig. 9 is a view similar to the left-hand portion of Fig. 1, illustrating a modification in the construction of the tray-discharging mechanism. Fig. 10 is a transverse section of the construction shown in Fig. 9. Fig. 11 is a perspective view of the tray-lowering rods shown in Figs. 9 and 10. Figs. 12 and 13 are sectional details illustrating another modified form of tray-lowering devices. Figs. 14, 15, 16, and 17 are views in perspective of various forms of trays for supporting various forms of food-holding vessels.

This invention is designed more particularly for use in what are known as "quick-lunch" restaurants, wherein the food is maintained in constant condition for use, but which may likewise be employed in ordinary restaurants, hotels, or for domestic purposes, and I do not, therefore, wish to be limited in its use in any specific locality, but reserve the right to its use wherever practicable.

For the purpose of illustration an approved form of the apparatus, such as are used in quick-lunch restaurants, is shown, and consists of an outer casing or shell 10, preferably with walls of glass or glass-like material, which will be easily cleansed and which, if of glass, will expose the interior of the casing to view. The material employed will be of sufficient thickness to withstand the strains to which it will be subjected, and the sheets of glass will be supported by suitable metal frames, as at 11, which may be plated and polished and otherwise ornamented and rendered attractive. The casing may thus be constructed of a highly-ornamented design and form an attractive portion of the restaurant-furnishings. The casing will be divided into independent compartments by transverse partitions 12, any number being employed, but generally three, as illustrated. Each of the compartments will be provided with closures hinged to the framework 11 and generally arranged, as shown, with large closures 13 14 for the rear sides of two of the compartments, as shown in Fig. 6, and large closures 15 16 for two of the compartments and a small closure 17 for the lower portion of the remaining compartment at the front, as shown in Fig. 5. By this arrangement, it will be noted, the central compartment is provided with hinged closures at both front and rear, one end compartment with a large closure at the rear and a small closure at the front, and the remaining compartment with a large closure at the front only and with no opening at the rear. Any suitable means may be employed for supplying heat to the compartments; but generally steam will be employed and supplied through a system of piping 18, with controlling-valves 19, 20, and 21, whereby the heat supplied to each compartment may be independently controlled. Within one of the compartments, preferably the central one when three are employed, is supported a frame formed of vertical corner members 22, connected by transverse members and provided with horizontal guides 24, the latter spaced apart and providing means for sustaining a plurality of trays for the support of the food-receptacles. The frame 22 24 is spaced from the walls of the casing and also from the dividing-partitions, so that the heating medium will freely pass around all sides of the frame and reach all portions of the contents of the trays. The trays are substantially of the same size and are formed generally with flat bottom portions 25 and vertical side and ends 26 and with spaced upwardly-extending lugs or studs 27. Any number of the trays may be employed, and the casing, frame, and trays may be of any required size or capacity, and I do not wish to be limited in any manner in this respect. One or more of the trays may be provided with transverse apertures, as at 29, to permit the heating medium to pass freely through the trays intermediately when required. The trays are designed to support the receptacles containing the food to be cooked, and these receptacles may be of any of the ordinary forms of such articles or of special forms, as may be required. By this means specially-formed receptacles may be employed upon the trays, whereby "individual" food products may be supplied—such as eggs, oysters, cup-custards, small meat pies, tarts, and the like—while at the same time larger receptacles may be employed for cooking all kinds of food in bulk or in any quantity required. Covered roasting-pans may be disposed upon the trays, as at 30, or other forms of food-receptacles employed, and the trays may be supplied with transverse ribs, as at 31, to confine the receptacles from lateral or longitudinal movement. The trays are designed to rest upon the guide members 24, and when thus arranged they are held apart so that the heating medium will pass freely around all sides of each tray and come in contact equally with all the food-receptacles and their contents and thoroughly cook them and for as long a period as required. When the food upon any one of the trays is sufficiently cooked, that particular tray may be readily removed without disturbing the others. Thus provision is made for treating different kinds or qualities of food products which require different degrees of heat or to be subjected to the heat for different periods of time. In the cooking-compartment having the hinged closures at both ends the trays may be inserted into or removed from the casing from either side, as will be obvious. Within one of the remaining compartments another supporting-frame is disposed, consisting of vertical members 32, suitable horizontal members, and transverse members 33. This latter frame is designed to support the trays in superimposed position, as represented, after the food in the receptacle thereon has been cooked to enable the temperature to be maintained until the food is required for use, and this temperature, as will be obvious, may be controlled by the valve 19. The function of the studs 27 is to hold the trays separated when superimposed in the warming-compartment, so that the food-receptacles will not interfere, and also to permit free access of the heating medium to all parts. The lowermost tray comes opposite the small closure 17, so that if all the trays except the lowermost one be supported or elevated slightly the lowermost tray may be withdrawn through the aperture 17. To thus elevate the upper trays, vertical rods 35 are supported for rotation in the frame-pieces and each provided with projecting "feet" 36 37, spaced apart vertically upon the rods and disposed at right angles to each other, as shown. The rods 35 are also provided with oppositely-disposed lugs 38 39 and the member 33 provided with stop-lugs 40, the stop-lugs being so disposed that when the lugs 38 engage the lugs 40 the feet 36 will be projected inwardly or into the paths of the trays and the feet 37 turned into longitudinal alinement with the members 33 and of trays or outside of the paths of the latter. Then when the positions are reversed, with the stop-lugs 39 engaging the lugs 40, the feet 37 will be turned inwardly and the feet 36 outwardly, as will be obvious. The feet 36 are disposed opposite the spaces formed by the lugs 27 above the lowermost tray and the feet 37 disposed above the space over the second tray from the bottom, so that when the rods 35 are set with the feet 36 inwardly all the trays except the lowermost one will be supported upon the feet 36, leaving the lowermost tray free to be removed through the small closure 17. Then by reversing the rods the next lowermost tray is caught by the feet 36 and the second lowermost tray placed in position to be caught by the feet 37 at the next movement of the rods, and so on as long as trays remain to be removed. By this simple means the trays may be removed one at a time and without disturbing the remaining trays or their contents. The upper ends of the rods 35 may be extended through the top of the casing 10, so that they be operated from outside the casing. The trays are inserted into the warming-compartment through the large opening covered by the closure 14. The frames in the cooking and warming compartments do not completely fill their respective compartments, as shown, leaving space for racks or shelves 41 to support food or food-receptacles which may require to be maintained at a relatively high temperature. Within the third compartment a plurality of frames or hangers 42 are mounted for rotation upon standards 43 and provided with weighted operating-handles 44 and adapted to support receptacles 45, in which coffee, milk, and similar liquid food products may be prepared and subjected to the required degree of heat. The receptacles held by the frame 42 will preferably be bottle-like in form, and the contents may be discharged by tilting them by the handles 44, as will be obvious. Any number of the frames 42 and their receptacles 45 may be employed and may be of any size and capacity. By these simple arrangements various kinds and qualities of food-products may be cooked and then maintained at any required temperature until required for use and coffee and similar products prepared and maintained in position for use as required.

The trays may be of any required form and size and arranged to hold various sizes and forms of vessels or food-supporting devices.

Fig. 4 shows a sliding door 17', arranged at the bottom of one of the compartments, having the trays disposed therein and arranged in position to receive the lowermost tray and carry it out by means of the weight 70, secured to the door 17' at 71 by means of a cable or chain 72, running over pulleys 73 and 74.

In Fig. 14 a form of tray for cooking eggs and similar food products is shown, the bottom 25 of this tray being of glass or glass-like material or substance, so that the eggs and similar articles of food will not be discolored, as they frequently are when cooked upon metal and similar surfaces. The tray having the glass bottom is illustrated in Fig. 14 and is shown divided into two separate compartments by transverse ribs 46, with one of the transverse openings 29 between the ribs. Resting upon the glass bottom of the tray is an open frame 47, in which the eggs will be cooked, the frame serving to confine them within a certain shape and size. The frames will generally be of the same size as the sandwich of which they are to form a part, so that when cooked they will correspond to the slices of bread between which they are to be placed. The frames can be formed to hold one or more eggs or other food product to be cooked and connected together, as in Fig. 14, or in separate or single frames, as may be preferred. The frames 47 will preferably be formed with tongues 48, adapted to engage apertures 49 in one of the sides 26 of the tray, as shown in Fig. 14, to assist in supporting the frame upon the tray and prevent accidental displacement.

In Fig. 15 a form of a tray is shown designed for supporting larger dishes or cooking or warming receptacles.

In Fig. 16 a tray is shown with two of the apertures 29 and food-receptacles 50 arranged in a group of three, which may be employed for some kinds of food.

In Fig. 17 a tray is formed provided with a plurality of small pans 51, in which portions of meat may be cooked and maintained at a uniform temperature, each pan being designed to hold enough meat for one sandwich, so that when a sandwich is ordered it can be served hot.

In Fig. 9 one of the trays is shown with tumbler-shaped receptacles 52, which will be found very convenient for cooking single eggs when ordered or other small quantities of food for small or individual orders.

The frames 47 can be of any desired shape or size and of any material which will meet the requirements.

In Figs. 9, 10, and 11 a modification in the manner of releasing the tray s in the warming-compartment is shown, consisting in a series of rods 53 54, arranged in pairs, one pair adjacent to each corner of the supporting-frame and preferably extending up through the casing 10. The rods are arranged to both rotate and move longitudinally in the frame and casing. The apertures in the frame member 33, through which the rods pass, are elongated, as at 55 56, and the rods are provided, respectively, with lugs 57, 58, 59, 60, 61, and 62. For the purpose of illustration a single pair of the rods are selected and designated by the reference character; but it will be understood each pair are precisely alike and operate in the same manner. When the rods 54 are in their lower position, as in Figs. 9, 10, and 11, the lower relatively wide lugs 62 will be opposite the second tray from the bottom, so that if these rods be turned to extend the lugs 61 transversely of the members 33 all the trays except the bottom one will be held up, leaving the bottom tray free to be removed from the small door 17. Then when the lowermost tray has been removed the next tray can be slowly lowered down by merely rotating the rods 54 until the lugs 61 come opposite the aperture 56, and this rotation will not release the lugs 62 from the tray, as their width will be great enough to permit a one-fourth revolution of the rod without causing their withdrawal from beneath the tray. When the tray has been lowered to its place, the rods 54 will be rotated still farther to withdraw the feet 62 and the rods then returned to their former position and rotated to bring the lugs 61 transversely of the members 33 and the feet 61 across the vertical paths of the trays. The rods 53, which have in the meantime been supporting the series of trays by their feet 59, are then rotated and the trays lowered until they rest upon the feet 62. The rods 53 are then rotated still farther to release their feet 59 from the trays and the rods moved upward to their former position and with the lugs 58 transversely of the member 33, which will move the feet 59 into the path of the trays and beneath the third tray from the bottom, and thus sustain all the trays but the lowermost two, as shown. By this simple means the trays may be extracted one at a time without disturbing the remainder. By this means the trays may be slowly lowered so as not to disturb their contents and may be employed when the trays contain liquid or other food products liable to be spilled.

In Figs. 12 and 13 another modified form of tray-lowering means is shown consisting of pins or rods 63 64, adapted to be inserted through suitable apertures into the paths of the trays, the pins arranged in pairs opposite the corners of the tray-frame and spaced to correspond with the spaces beneath the second and third trays from the bottom, as shown. By this simple arrangement the trays may be removed one at a time, as will be obvious.

In the foregoing description is shown the preferred form of the invention, but is not necessarily limited thereto, as modifications may be made therein without departing from the principle of the invention or sacrificing any of its advantages, and the right is therefore reserved of making all the changes which may fairly come within the scope of the invention and the claims made therefor.

Having thus described the invention, what I claim is—

1. In an apparatus of the class described, a casing divided into independent compartments, a supporting-frame formed with spaced guides within one of said compartments, a plurality of trays adapted to maintain food-receptacles and independently supported upon said guides, said trays having spaced lugs projecting above the rims thereof to support the tray above when said trays are superimposed within the other of said compartments, heating means adapted to supply heat to said compartments, and means for independently controlling the heat supplied to said compartments, substantially as described.

2. In an apparatus of the class described, a casing divided into independent compartments, a supporting-frame formed with spaced guides within one of said compartments, a plurality of trays adapted to maintain food-receptacles and independently supported upon said guides, means whereby said trays may be superimposed within the other of said compartments, means for independently discharging said superimposed trays from said compartment, heating means adapted to supply heat to said compartments, and means for independently controlling the heat supplied to said compartments, substantially as described.

3. In an apparatus of the class described, an inclosing casing, a supporting-frame spaced from the walls of said casing, a plurality of trays for the support of food-receptacles and adapted to be superimposed within said frame, and means carried by said frame for elevating and supporting all of said trays except the lowermost one, whereby the lowermost tray may be removed without disturbing the remainder, substantially as described.

4. In an apparatus of the class described, an inclosing casing, a plurality of trays for the support of food-receptacles and adapted to be superimposed within said casing, spaced vertical rods supported for oscillation and provided with vertically-spaced lateral arms extending at right angles to each other and adapted to be alternately projected beneath said trays by the oscillation of the rods, whereby all of said trays except the lowermost one may be supported and the said lowermost tray extracted, substantially as described.

5. In an apparatus of the class described, a tray adapted to support the food-receptacles formed with an elevated rim and with spaced lugs extending above said rim, and having laterally-extending arms to support a superimposed tray and providing spaces for the passage of the heating medium when the trays are superimposed, substantially as described.

6. In an apparatus of the class described, an inclosing casing, a supporting-frame spaced from the walls of said casing, a plurality of trays for the support of food-receptacles and adapted to be superimposed within said frame, means carried by said frame for elevating and supporting all of said trays except the lowermost one, a frame slidably disposed beneath said superimposed trays, a weight connected to automatically move said slidable frame outwardly and a catch adapted to hold said slidable frame detachably in its closed position whereby when said lowermost tray is released it may be automatically discharged by releasing said catch, substantially as described.

7. In an apparatus of the class described a tray formed with a bottom of glass or glass-like material or substance, and with which the food to be cooked comes in direct contact substantially as described.

8. In an apparatus of the class described a tray formed with a bottom of glass or glass-like material or substance, and with which the food to be cooked comes in direct contact in combination with open frames resting upon said cooking-surface and confining the food product thereon, substantially as described.

In testimony that I claim the foregoing as my own I have hereto affixed my signature in the presence of two witnesses.

ARTHUR T. BRADSHAW.

Witnesses:
M. P. WHIPPLE,
FRED W. WHIPPLE.